United States Patent
Tokunaga et al.

[11] Patent Number: 6,155,377
[45] Date of Patent: Dec. 5, 2000

[54] VARIABLE GEAR RATIO STEERING SYSTEM

[75] Inventors: Hiroyuki Tokunaga; Yasuo Shimizu, both of Wako, Japan

[73] Assignee: Honda Giken Kogyo Kabushiki Kaisha, Tokyo, Japan

[21] Appl. No.: 09/124,749

[22] Filed: Jul. 29, 1998

[30] Foreign Application Priority Data

Aug. 1, 1997 [JP] Japan ..................................... 9-208032

[51] Int. Cl.$^7$ ....................................................... B62D 5/04
[52] U.S. Cl. ............................................. 180/446; 74/398
[58] Field of Search ..................................... 180/400, 443, 180/446; 464/102–104; 74/393, 395, 396, 398, 498

[56] References Cited

U.S. PATENT DOCUMENTS

| | | | |
|---|---|---|---|
| 4,658,927 | 4/1987 | Kanazawa | 180/142 |
| 5,423,391 | 6/1995 | Shimizu | 180/79.1 |
| 5,489,004 | 2/1996 | Shimizu et al. . | |
| 5,503,239 | 4/1996 | Shimizu . | |
| 5,869,753 | 2/1999 | Asanuma | 73/117.3 |

*Primary Examiner*—Christopher P. Schwartz
*Assistant Examiner*—C. T. Bartz
*Attorney, Agent, or Firm*—Arent Fox Kintner Plotkin & Kahn, PLLC

[57] ABSTRACT

In a variable gear ratio steering system, a control unit determines the steering angle ratio which is to be achieved by the steering angle ratio varying unit according to a condition of the vehicle with respect to a given road condition. Such vehicle conditions may include a road surface frictional coefficient so that an excessive steering may be avoided on slippery road surfaces by increasing the steering gear ratio under such conditions. Such vehicle conditions may also include a side force utilization ratio of the steerable wheels so that an excessive steering may be avoided when there is little margin in the available side force for the steerable wheels. The steering system may include a CCD camera for determining the lateral position of the vehicle relative to the current driving lane and a control unit for determining the predicted lateral travel of the vehicle, typically from the steering input angle and the vehicle speed, so that the steering gear ratio may be increased when the vehicle has traveled or drifted sideways more than predicted. Thereby, the vehicle is prevented from inadvertently drifting out of the driving lane.

30 Claims, 13 Drawing Sheets

VARIABLE GEAR RATIO STEERING SYSTEM

TECHNICAL FIELD

The present invention relates to a variable gear ratio steering system for a vehicle which can vary the ratio of the steering input angle of the steering wheel to the steered angle of the steerable road wheels or the steering gear ratio.

BACKGROUND OF THE INVENTION

Variable gear ratio steering systems are widely known in the art, and are known to reduce the effort required to steer the vehicle in a low speed range (or for a large steering angle) and to improve the stability of the vehicle in a high speed range (or for a small steering angle). Such a system typically provides a low gear ratio (in the sense that the steering angle of the road wheels is relatively large for a given steering angle of the steering wheel) for a large steering angle, and a high gear ratio (in the sense that the steering angle of the road wheels is relatively small for a given steering angle of the steering wheel) for a small steering angle. Because the steering angle of the vehicle is necessarily small in a high speed range, and large steering angles are required only when the vehicle is moving at a low speed, such a system in effect allows the vehicle operator to finely steer the vehicle in a high speed range, and highly sharply in a low speed range, thereby improving the handling of the vehicle in all speed ranges. Such variable gear ratio steering systems are proposed in commonly assigned U.S. Pat. Nos. 5,489,004 issued to Y. Shimizu et al. Feb. 6, 1996, and No. 5,503,239 issued to Y. Shimizu Apr. 2, 1996. The contents of these patents are incorporated herein by reference.

Such systems are found to be highly effective in improving the handling of the vehicle, but the Inventors of this application have discovered that the handling of the vehicle may be improved even further by modifying the gear ratio of the steering system under certain circumstances. For instance, the gear ratio should be increased when the road surface is significantly slippery.

BRIEF SUMMARY OF THE INVENTION

In view of such a recognition by the Inventors, a primary object of the present invention is to provide a variable gear ratio steering system which is even more effective in improving the handling of the vehicle.

A second object of the present invention is to provide a variable gear ratio steering system which can significantly reduce the effort required for the vehicle operator in situations where excessive steering angles are desired to be controlled.

A third object of the present invention is to provide a variable gear ratio steering system which can minimize the fatigue of the vehicle operator by simplifying the effort required to steer the vehicle in all conceivable situations.

According to the present invention, these and other objects can be accomplished by providing a variable gear ratio steering system for a vehicle which can vary a ratio of a steering input angle of a steering wheel to a steering output angle of steerable wheels, comprising: an input shaft rotatably supported by a casing for receiving a steering input; an output shaft rotatably supported by the casing to transmit a steering output to the steerable wheels of the vehicle; a variable ratio gear unit interposed between the input shaft and the output shaft for transmitting rotative power from the input shaft to the output shaft; steering angle ratio varying means associated with the variable ratio gear unit to vary the steering angle ratio; and control means for determining the steering angle ratio which is to be achieved by the steering angle ratio varying means according to a condition of the vehicle with respect to a given road condition.

Such vehicle conditions may include a road surface frictional coefficient so that an excessive steering may be avoided on slippery road surfaces by increasing the steering gear ratio under such conditions. Such vehicle conditions may also include a side force utilization ratio of the steerable wheels. In this case, an excessive steering may be avoided when there is little margin in the available side force for the steerable wheels.

Alternatively or additionally, the steering system may include means such as a CCD camera for determining the lateral position of the vehicle relative to the current driving lane and means for determining the predicted lateral travel of the vehicle, typically from the steering input angle and the vehicle speed, so that the steering gear ratio may be increased when the vehicle is expected to travel or drift sideways from a target drive path according to the detected current steering angle. Thereby, the vehicle is prevented from inadvertently drifting out of the driving lane.

A similar object can be achieved by comparing the target vehicle position which, for instance, may be determined from the shape of the road ahead of the vehicle, with the predicted vehicle position which, for instance, may be determined from the vehicle speed and the steering angle, and increasing the steering gear ratio when the current steering angle is expected to cause a deviation from the target drive path.

Preferably, the variable ratio gear unit is adapted to reduce the steering angle ratio when the steering input angle is increased, and this tendency may be enhanced as the vehicle speed increases. Thereby, the vehicle operator can accurately steer the vehicle when the vehicle speed is high and the steering angle is small and is required to be finely controlled. Conversely, when the vehicle speed is low or when a large steering angle is desired, the variable gear ratio steering system allows the vehicle to make tight turns. Thus, the vehicle operator is enabled to operate the vehicle with a minimum effort in all speed ranges.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
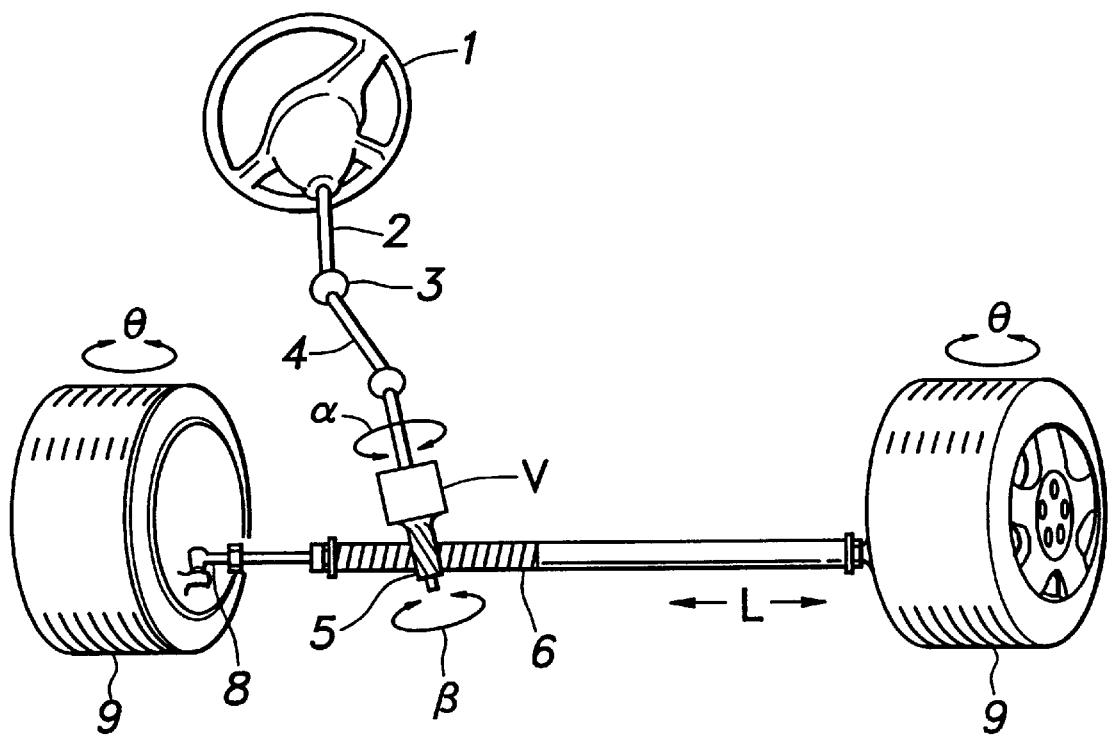
FIG. 1 is a schematic view showing a general structure of a vehicle steering system to which the present invention is applied.

Referring to FIG. 1 which schematically illustrates an overall rack and pinion steering system to which the present invention is applied, a steering wheel 1 is securely attached to an upper end of a steering shaft 2, and a lower end of the steering shaft 2 is connected to a coupling shaft 4 via a pair of universal joints 3. A pinion 5 is securely attached to a lower end of the coupling shaft 4, and meshes with a rack 6 which is connected to road wheels 9 via tie rods 7 and knuckle arms 8 as well known in the art. Thus, the rotational movement ($\beta$) of the pinion 5 is converted into a linear movement (L) of the rack 6 meshing with the pinion 5, which is in turn converted into a steering angle ($\theta$) of the road wheels 9 via the tie rods 7 and the knuckle arms 8.

Figure 2:
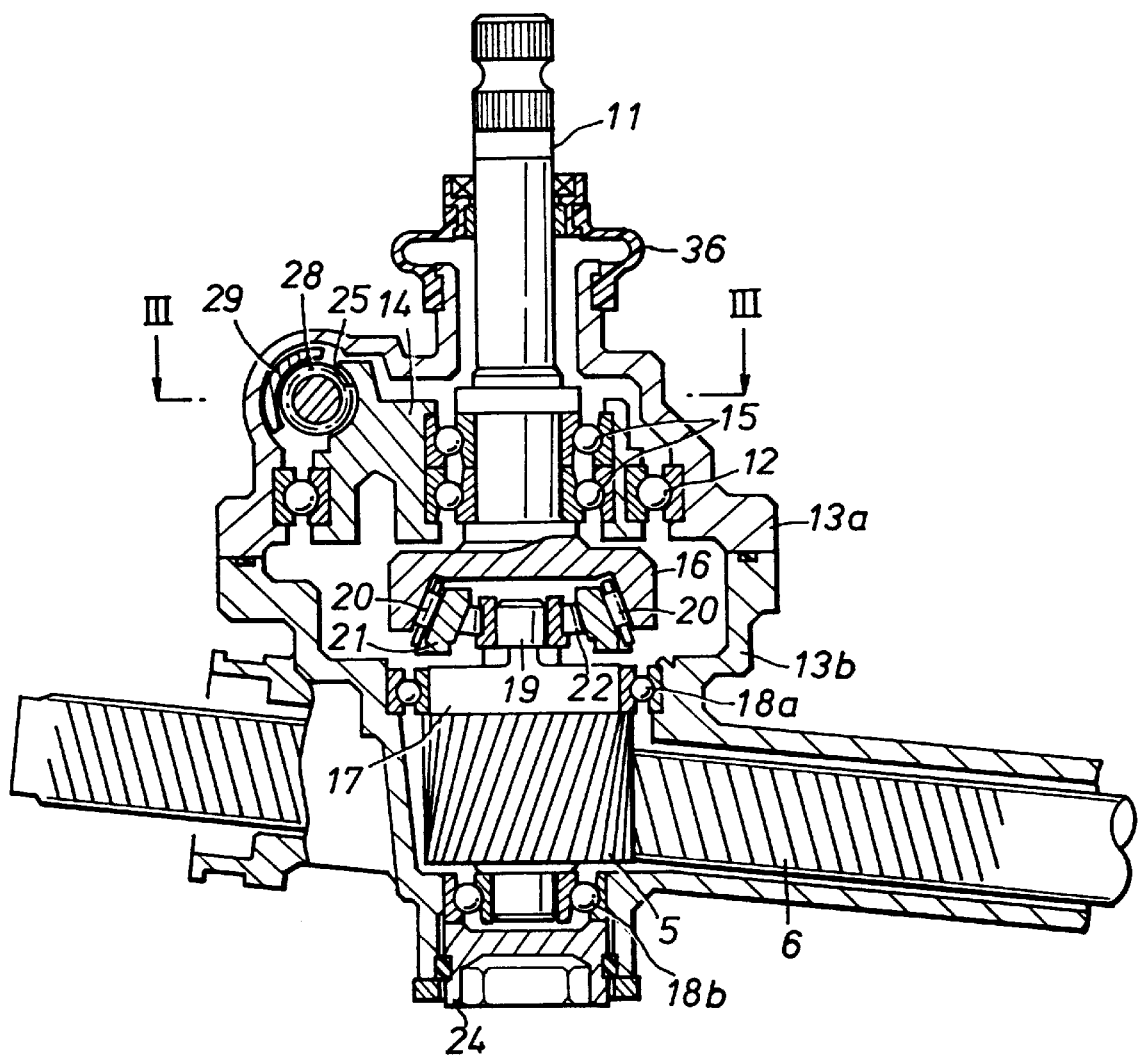
FIG. 2 is a sectional side view showing a possible mechanical arrangement of the variable ratio steering system according to the present invention.
Figure 3:
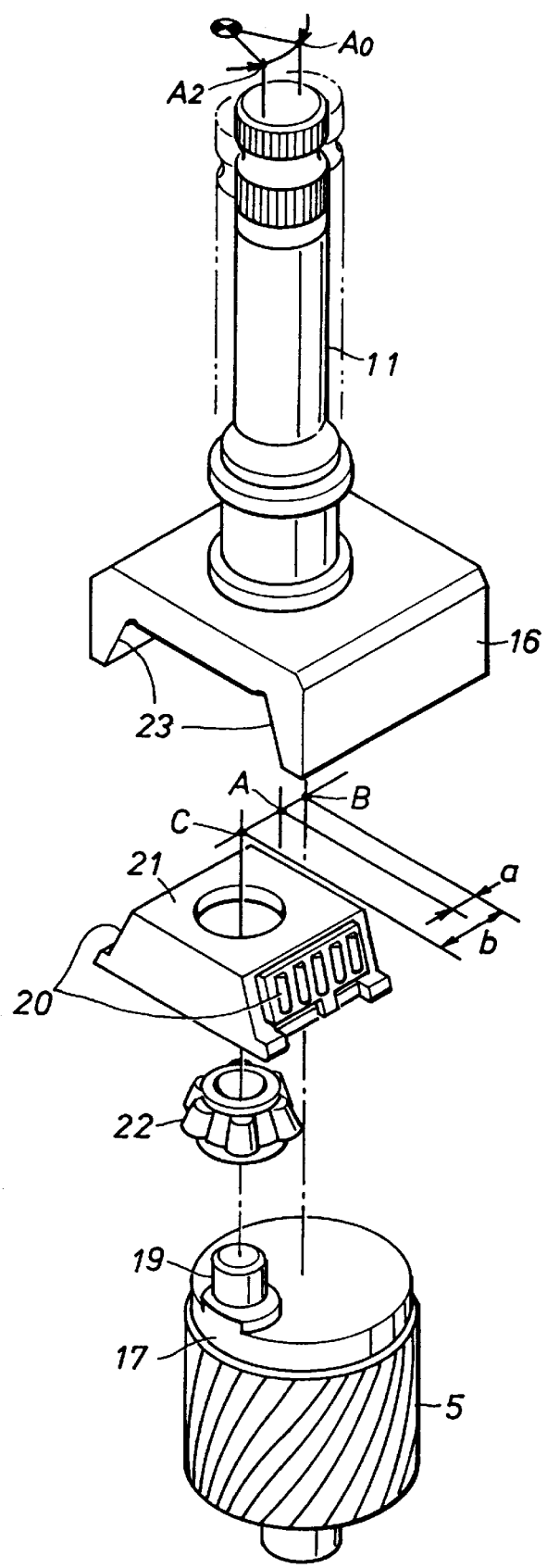
FIG. 3 is an exploded perspective view of the major torque transmitting parts of the mechanical arrangement shown in FIG. 2.
Figure 4:
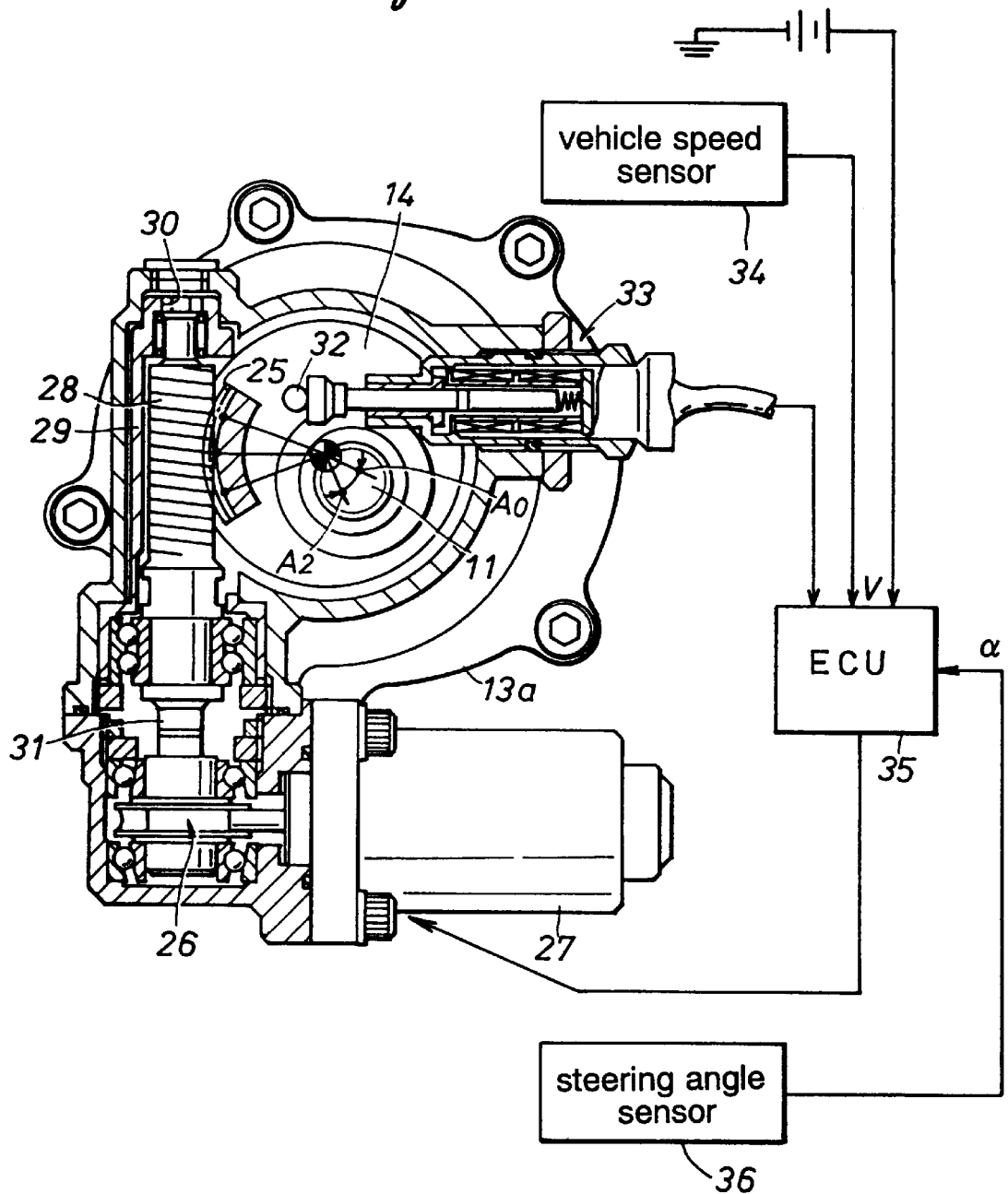
FIG. 4 is a sectional plan view taken along line IV—IV of FIG. 2.

FIGS. 2 to 4 show a mechanical arrangement of the steering system according to the present invention. This steering system is intended to be installed in the part indicated by "V" in FIG. 1, and comprises an input shaft 11 which is connected to the steering wheel 1, and a support member 14 which is rotatably supported by an upper casing 13a via a ball bearing 12. The support member 14 supports the input shaft 11 in a freely rotatable manner at an eccentric position thereof via a pair of ball bearings 15. A lower end of the input shaft 11 which is received in a lower casing 13b is integrally provided with a coupling member 16 having a divergent channel-like shape. This coupling member 16 has the shape of letter-C as seen from a side, and defines a pair of inclined planar inner surfaces 23 on either side thereof.

The output shaft 17 is integrally provided with the pinion 5 which meshes with the rack 6 so as to convert the rotational movement of the output shaft 17 into a linear movement of the rack 6, and is rotatably supported by the lower casing 13b via a pair of ball bearings 18a and 18b. An intermediate shaft 19 which projects eccentrically from the upper end of the output shaft 17 in the lower casing 13b is received in the coupling member 16, and extends in parallel with the output shaft 17.

The intermediate shaft 19 and the coupling member 16 integrally formed with the input shaft 11 are coupled with each other via a slider 21 incorporated with a pair of planar needle bearings 20 and a conical roller bearing 22. The slider 21 has the shape of a box having an open bottom, and the side walls diverge downward. The needle bearings 20 are placed on the outer surfaces of a pair of opposing inclined side walls of the slider 21, and these side walls are in parallel with the inclined inner side wall surfaces 23 of the coupling member 16.

Thus, the slider 21 incorporated with the pair of planar needle bearings 20 is received in the recess defined between the inclined planar inner surfaces 23 of the coupling member 16 so as to be able to freely slide in a direction perpendicular to the axial line of the input shaft 11. A middle part of the upper wall of the slider 21 is provided with an opening which receives therein the intermediate shaft 19 via the conical roller bearing 22 so as to be freely rotatable relative to each other.

A flexible tubular seal member 36 is fitted between the input shaft 11 and the upper casing 13a to maintain the interior of the casing in an air tight manner while accommodating lateral movement of the input shaft 11 relative to the casing 13 arising due to the eccentricity of the input shaft 11 relative to the output shaft 17.

An adjust screw 24 is threaded into an axial hole passed through the bottom end of the lower casing 13b and engages the lower end surface of the outer race of the ball bearing 18b supporting the lower end of the output shaft 17. By appropriately threading the adjust screw 24 into and out of the lower casing 13b, the pinion 5 can be appropriately axially urged so as to apply a suitable pre-stress between the input shaft 11 and the output shaft 17 which are coupled with each other via the coupling assembly described above. Thus, by virtue of the adjust screw 24, the play of the coupling assembly consisting of the coupling member 16, the needle bearings 20, and the slider 21 can be removed, and the overall mechanical rigidity of the torque transmitting members of the steering system can be ensured.

As best illustrated in FIG. 4, a part of the outer periphery of the support member 14 is integrally provided with a sector gear 25, and a worm 28 rotatively actuated by a motor 27 via a reduction gear unit 26 meshes with this sector gear 25 so that the support member 14 can be rotated within a certain angular range as required. This worm 28 is supported by the upper casing 13a via a backlash removing member 29 consisting of an eccentric cam. By fitting a hexagonal wrench into a hexagonal hole 30 provided in an end portion of the backlash removing member 29, and turning it relative to the upper casing 13a, the axial center of the worm 28 can be laterally moved, and the play in the meshing engagement between the worm 28 and the sector gear 25 can be controlled at will. The backlash removing member 29 can be exposed by removing a rubber or synthetic resin cap fitted into an opening of the upper casing 13a for allowing access to this hexagonal hole 30. To accommodate the thus caused slight movement of the axial center of the worm 28, the worm 28 and the reduction gear unit 26 are connected with each other via an Oldham coupling 31.

The upper casing 13a is provided with a displacement sensor 33 consisting of a differential transformer or the like for detecting the rotational angle of the support member 14 by engaging a pin 32 projecting from an upper surface of the support member 14. A vehicle speed sensor 34 is provided in a suitable location of the vehicle body to detect the travelling speed V of the vehicle.

In this steering system, the rotational angle of the support member 14 detected by the displacement sensor 33 or the eccentricity of the input shaft 11 supported by the support member 14 relative to the output shaft 17 which is supported by the fixed casing 13, and the vehicle speed detected by the vehicle speed sensor 34 are supplied to a control unit 35 which controls the operation of the motor 27 by feedback control so as to eliminate the deviation of the actual eccentricity detected by the displacement sensor 33 from a target eccentricity computed for each given vehicle speed. The control unit 35 also receives an output from a steering angle sensor 36 for detecting an input steering angle $\alpha$.

Now the operation of the steering system according to the present invention is described in the following.

Referring to FIGS. 2 to 4, when the support member 14 is turned, the eccentricity of the support member 14 relative to the input shaft 11 causes the axial center of the input shaft 11 to move over the range indicated by $A_0$–$A_2$. Thus, by appropriately changing the eccentricity "a" between the input shaft 11 and the output shaft 17, a certain difference is created in the relationship between the rotational angles of the input shaft 11 and the output shaft 17 as described hereinafter in more detail.

By varying the eccentricity "a" of the axial center of the input shaft 11 relative to the axial center of the output shaft 17 in a continuous manner over the range of $a_2$–$a_0$ ($a_2 > a_1 > a_0 = 0$), it is possible to change the ratio ($\alpha/\beta$) of the rotational angle of the input shaft 11 (input angle=$\alpha$) to the rotational angle of the output shaft (output angle=$\beta$) or the steering gear ratio in a continuous manner.

The relationship between the input angle and the output angle is described in more detail with reference to FIG. 5 in which "A" indicates the rotational center of the input shaft 11, "B" indicates the rotational center of the output shaft 17, "C" indicates the point of action between the input shaft 11 and the intermediate shaft 19, "b" indicates the distance between "B" and "C", "a" indicates the eccentricity between the input shaft 11 and the output shaft 17, "$\alpha$" indicates the rotational angle (steering wheel angle) of the input shaft 11, and "$\beta$" indicates the rotational angle (pinion angle) of the out put shaft 17.

Suppose that the point of action between the input shaft 11 and the intermediate shaft 19 is at point P when the input shaft 11 is turned by angle $\alpha$. Because $AP \cdot \sin \alpha = b \cdot \sin \beta$, and $AP \cdot \cos \alpha + a = b \cdot \cos \beta$, $b \cdot \sin \beta / \sin \alpha = (b \cdot \cos \beta - a)/\cos \alpha$.

Hence, $\tan \alpha = b \cdot \sin \beta / (b \cdot \cos \beta - a)$ or, $\alpha = \tan^{-1} \{b \cdot \sin \beta / (b \cdot \cos \beta - a)\}$.

Thus, as the input shaft 11 is turned around point "A" by angle $\alpha$, the intermediate shaft 19 rotates around the output shaft 17 or point "B" by angle $\beta$ in the manner of a crank shaft via the slider 21 and the coupling member 16. As one can readily see from FIG. 5, as the input angle $\alpha$ is increased to $\alpha_1$, and the output angle $\beta$ is increased to $\beta 1$ accordingly, the point of action moves to point Q, and the increase in the output angle for a given increment of the input angle increases as described in more detail in the following.

Now, if the axial center of the input shaft 11 is placed at point $A_0$ by turning the supporting member 14 appropriately, and the points A and B are made to coincide with each other, or the input shaft 11 and the output shaft 17 are made to align with each other, they rotate by the same angle or as if they were integrally coupled with each other. This relationship is indicated by the chain dot line $a_0$ in FIG. 6.

Figure 5:
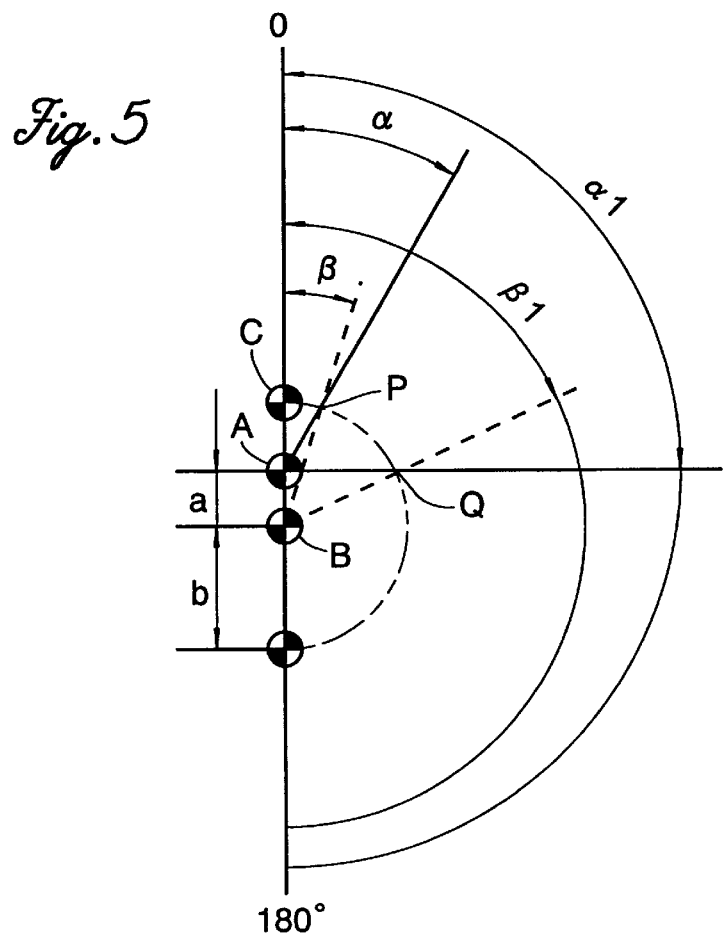
FIG. 5 is a diagram for illustrating the working principle of the mechanical arrangement shown in FIG. 2.
Figure 6:
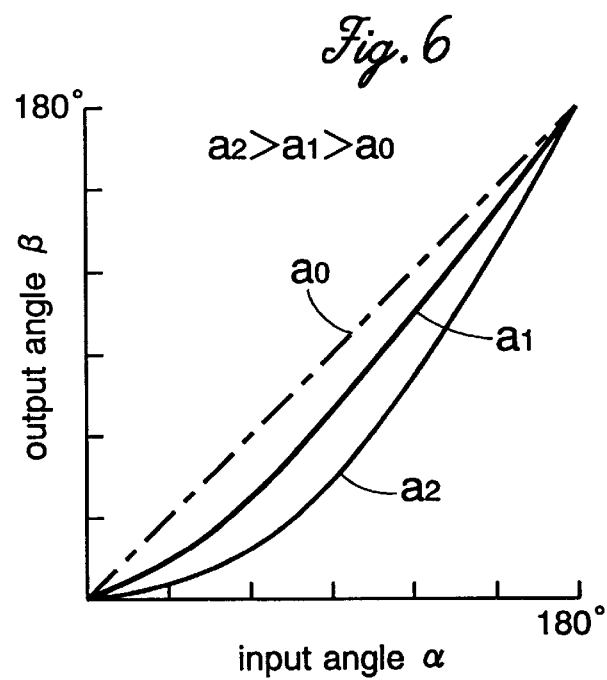
FIG. 6 is a graph showing the relationships between the rotational angle of the input shaft and that of the output shaft for different vehicle speeds.

When the axial center of the input shaft 11 is placed at an intermediate point by turning the supporting member 14 appropriately, and points A and B are arranged as illustrated in FIG. 5 (the general case), the output angle $\beta$ changes with the input angle $\alpha$ as indicated by the bold line curve $a_1$ in FIG. 6. More specifically, the change in the output angle $\beta$ for each given increment of the input angle $\alpha$ is relatively small in a low speed range, and progressively increases as the input angle $\alpha$ increases.

When the vehicle speed is increased, and the support member 14 is turned further, and the eccentricity a between the input shaft 11 and the output shaft 17 (or the distance between A and B) is maximized, this tendency is further enhanced as indicated by the fine line curve $a_2$ of FIG. 6.

Figure 7:
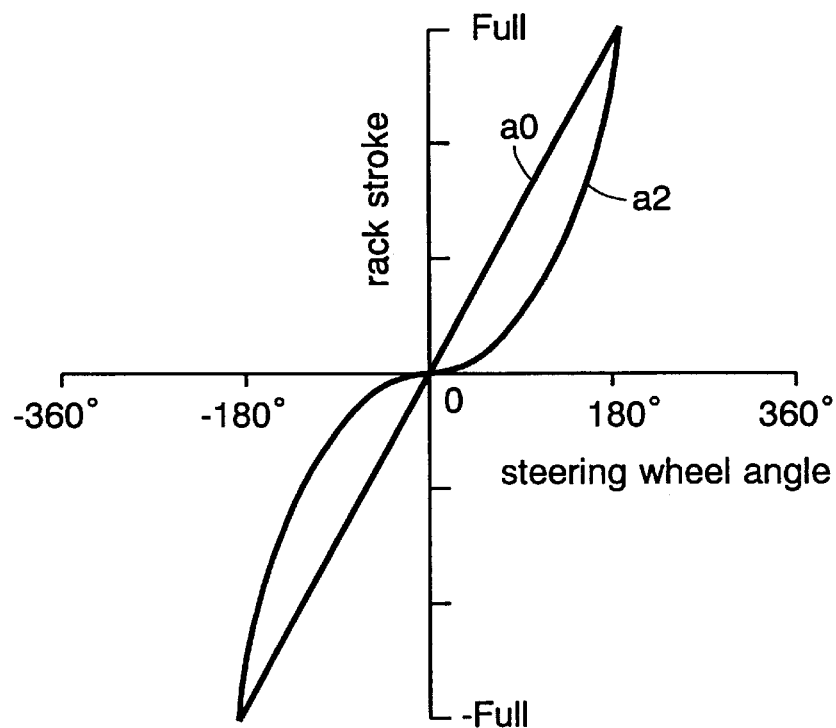
FIG. 7 is a graph showing various possible relationships between the steering input and the rack stroke.
Figure 8:
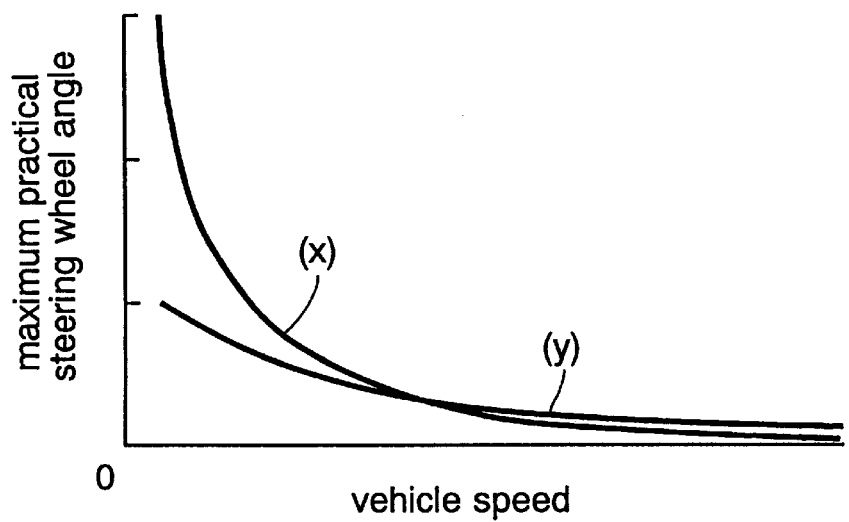
FIG. 8 is a graph showing the relationship between the maximum practical steering input and the vehicle speed.

Thus, a sharp steering property can be obtained in a low speed range by increasing the stroke L of the rack 6 for a given increment of the steering angle of the steering wheel, and a stable property can be achieved by reducing the rack stroke for a given increment of the steering angle of the steering wheel in a high speed range. Also, at a given vehicle speed (with the exception of an extremely low speed range), the increase in the output angle for a given increment of the input angle is small when the input angle is small, but progressively increases as the input angle is increased. The relationship between the input steering angle and the rack stroke can be varied over the range indicated by the bold line curves in FIG. 7 according to the speed of the vehicle. In short, according to the present invention, the relationship between the typically selected maximum steering wheel angle (practical steering angle) and the vehicle speed may be made flat as indicated by the bold line curve (y) in FIG. 8 in comparison with the corresponding relationship of a fixed ratio steering system indicated by the fine line curve (x).

Figure 9:
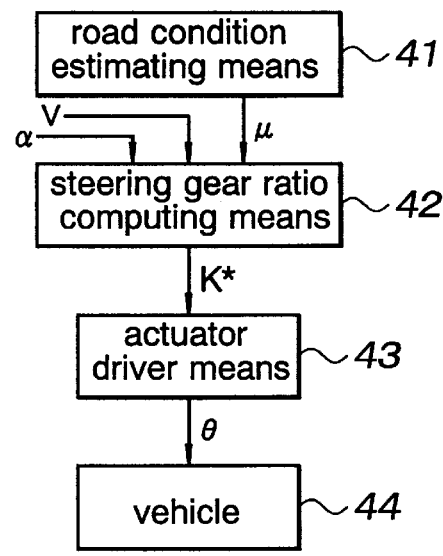
FIG. 9 is a block diagram showing a first embodiment of the control arrangement for the variable gear ratio steering system according to the present invention.

According to a first embodiment of the present invention, the control unit 35 responds to the road frictional coefficient $\mu$. This additional feature of the mode of operation of the control unit 35 is described in the following with reference to the block diagram of FIG. 9.

The control unit 35 typically consists of a microprocessor which operates according to a certain program, and is thereby incorporated with various functional means such as road condition estimating means 41, steering gear ratio computing means 42, and actuator driver means 43. The road condition estimating means 41 estimates the road frictional coefficient $\mu$ according to any known method, and supplies the estimated road frictional coefficient $\mu$ to the steering gear ratio computing means 42 which computes the base target steering angle ratio K according to the vehicle speed V and the steering angle $\alpha$, and a modification factor R for modifying the base target steering angle ratio K into the modified target steering angle ratio K* according to the estimated road frictional coefficient $\mu$. The actuator driver means 43 then activates the motor 27 so as to achieve the modified target steering angle ratio K*.

Figure 10:
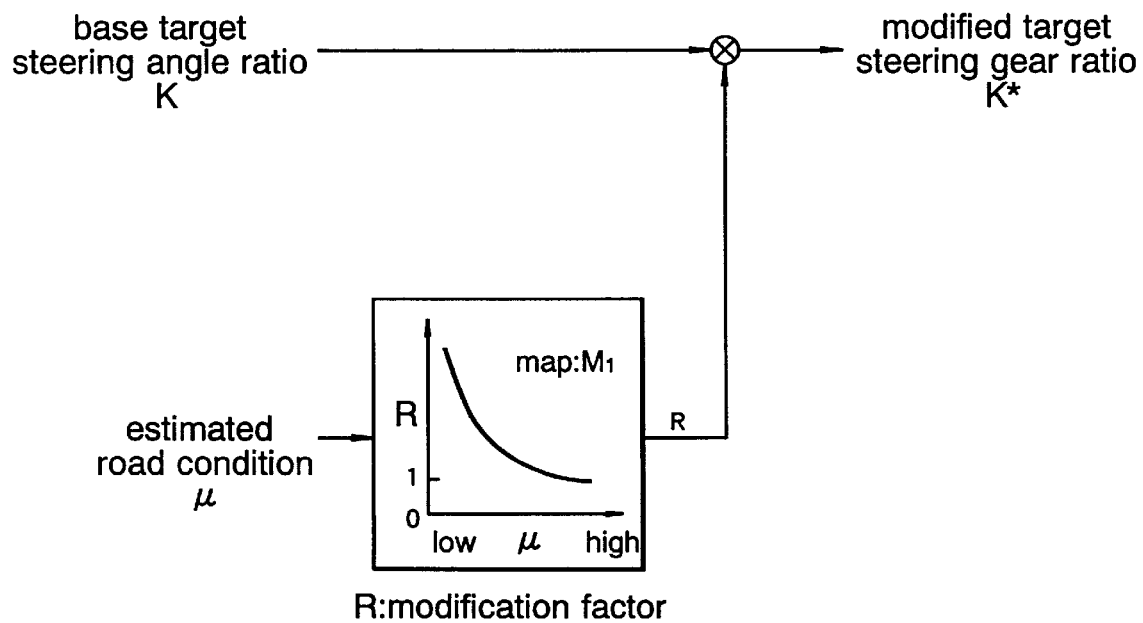
FIG. 10 is a block diagram for illustrating the control action of the steering gear ratio computing means shown in FIG. 9.

Typically, when the road frictional coefficient $\mu$ is relatively low, the steering gear ratio is desired to be increased in view of avoiding excessive steering under such a condition. The steering gear ratio computing means 42 is incorporated with a modification factor map M1 to produce the modification factor R as a mathematical function of the road frictional coefficient $\mu$ which is then multiplied to the target steering angle ratio K to produce the modified target steering angle ratio K* as shown in FIG. 10. The modification factor R has a minimum value of 1, and progressively increases with decrease in the road frictional coefficient $\mu$ shown in FIG. 10.

The road frictional coefficient $\mu$ can be estimated with any one of a number of known methods such as those disclosed in commonly assigned U.S. Pat. No. 5,869,753 issued Feb. 9, 1999. (U.S. Ser. No. 08/697,233 filed Aug. 21, 1996), the contents of which are hereby incorporated in this application by reference. An exemplary method is described in the following with reference to FIG. 11.

The following relationship holds between the road frictional coefficient $\mu$ and the cornering power Cp of the tire according to the Fiala's equation (second term approximation).

$$Cp = Sc(1 - 0.0166\, Sc/\mu W)$$

where Sc denotes the cornering stiffness, and W denotes the tire contact load. Because the tire cornering power Cp diminishes with the reduction in the road frictional coefficient $\mu$ as shown in FIG. 11, in the case of a rack and pinion steering system, the rack axial force Fr diminishes with the reduction in the road frictional coefficient $\mu$ for a given steering angle.

Therefore, the road frictional coefficient $\mu$ can be estimated by comparing the actual axial rack reaction Frc for a given front wheel steering angle $\theta$ with a reference axial rack reaction Frm which can be obtained from a mathematical model of the vehicle based on actual measurement of the response of the vehicle.

Figure 11:
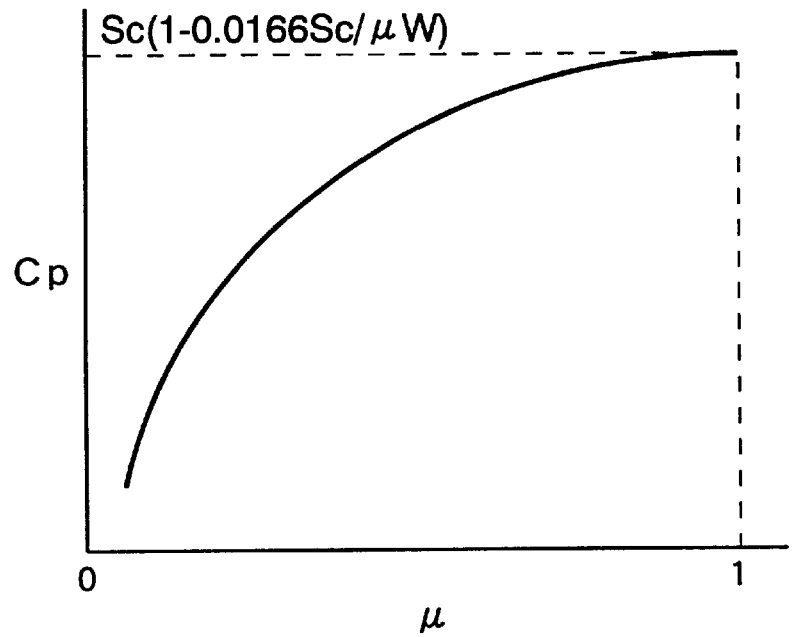
FIG. 11 is a graph showing the relationship between the cornering power and the road frictional coefficient.

More specifically, because the cornering power Cp diminishes with the reduction in the road frictional coefficient $\mu$ as shown in FIG. 11, in the case of a rack and pinion steering system, the axial rack reaction for a given steering angle diminishes with the reduction in the road frictional coefficient $\mu$. The front wheel steering angle and the axial rack reaction are actually measured, and the actual rack reaction for the given front wheel steering angle is compared with the reference axial rack reaction based on the mathematical model to estimate the road frictional coefficient $\mu$. When an electric power steering system is used, the actual axial rack reaction can be readily obtained from the axial force sensor incorporated in the steering system.

Figure 12:
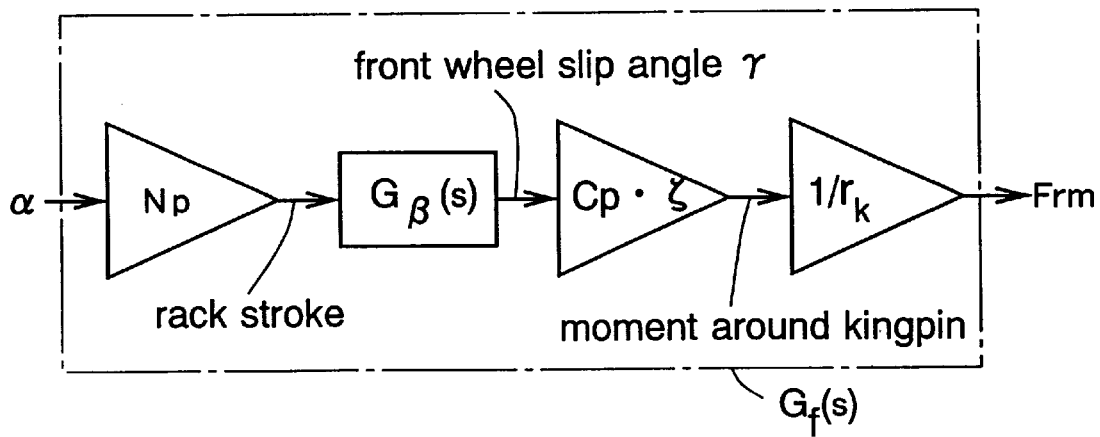
FIG. 12 is a block diagram for describing an internal mathematical model of the vehicle.

Now is described how the mathematical model of the vehicle for producing the reference axial rack reaction may be constructed. As shown in FIG. 12, the steering input $\alpha$ applied to the steering wheel is converted into a stroke of the rack via the rack and pinion mechanism having a transmission ratio of Np. The rack stroke produces a corresponding front wheel steering angle $\beta$ which in turn gives rise to a corresponding front wheel side slip angle $\gamma$ at the given traveling speed of the vehicle. The transfer function $G_\beta(s)$ which describes the conversion of the rack stroke to the front wheel slip angle changes in dependence on the stability factor which in turn depends on the road frictional coefficient $\mu$.

By multiplying the cornering power Cp and the trail $\zeta$ (caster trail+pneumatic trail) to the front wheel side slip angle $\gamma$, one can obtain the moment around the kingpin. The cornering power Cp and the pneumatic trail depend on the road frictional coefficient $\mu$ and the tire contact load W. The reference axial rack reaction Frm can be obtained by dividing the moment around the kingpin by the knuckle arm length $r_k$ or the distance between the rotational center of the tire and the center of the rack axial line.

Thus, it can be seen that the response of the reference axial rack reaction Frm to the steering input $\alpha$ can be substantially accurately described by the single transfer function $G_f(s)$ which can be obtained or identified from theoretical estimation or actual measurements.

Figure 13:
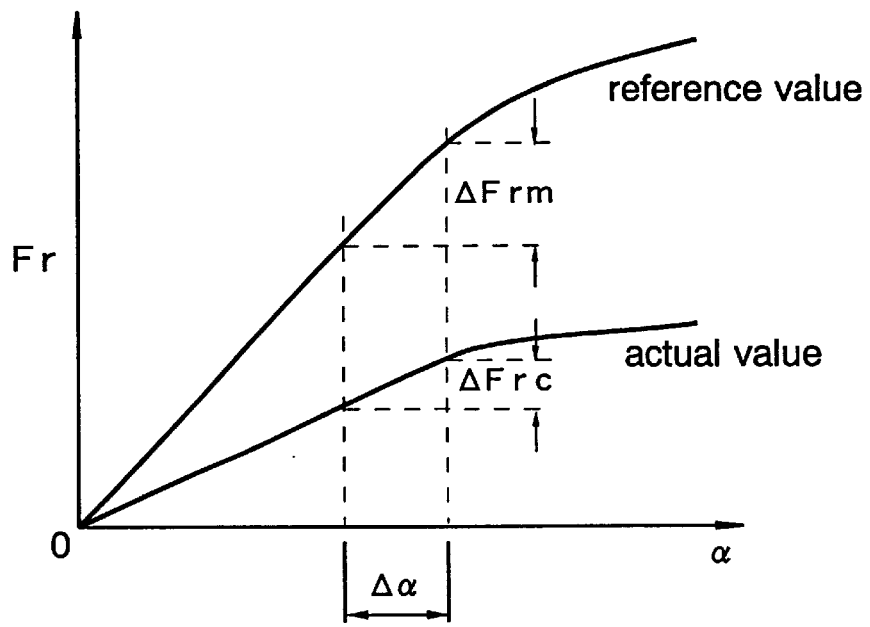
FIG. 13 is a graph showing the changes of the actual and computed rack reactions in relation with the steering input angle.
Figure 14:
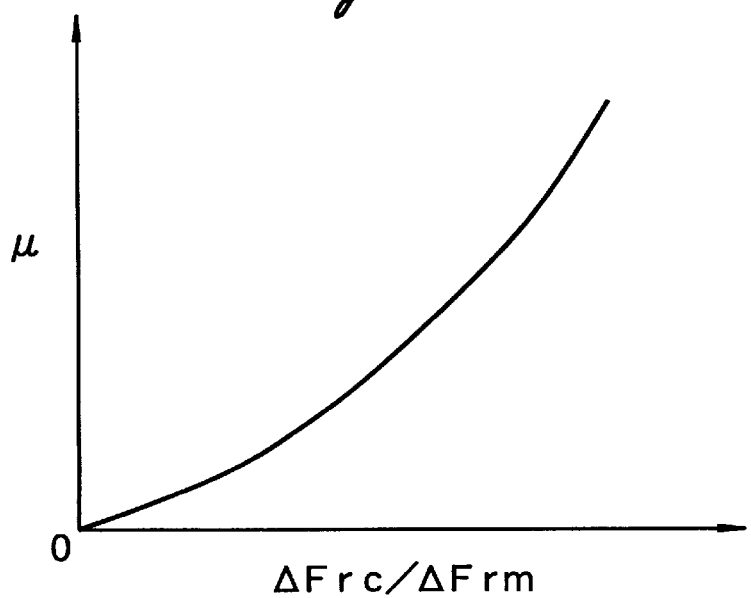
FIG. 14 is a graph showing the relationship between the ratio of the increment of the actual rack reaction to the increment of the computed rack reaction to the road surface frictional coefficient.

As shown in FIG. 13, from the actual axial rack reaction Frc and the reference axial rack reaction Frm, the incremental increases $\Delta$Frc and $\Delta$Frmc of the actual and reference axial rack reactions for a given incremental increase $\Delta\alpha$ of the steering input are obtained. The road frictional coefficient $\mu$ can be obtained by looking up a prescribed road frictional coefficient map (FIG. 14) with the ratio $\Delta$Frc/$\Delta$Frm of the incremental increase of the actual reference axial rack reaction for the given incremental increase ($\Delta$Frc/$\Delta\alpha$) to the incremental increase of the reference axial rack reaction for the given incremental increase ($\Delta$Frm/$\Delta\alpha$) within a small steering angle range which permits a linear approximation of the vehicle response.

The steering gear ratio computing means 42 computes the basic gear ratio K which allows a stable cornering for the given vehicle speed V and the steering angle $\alpha$, and the modified gear ratio K* by multiplying the modification factor R, which is computed from the map M1 according to the estimated road frictional coefficient, to the basic gear ratio K. Thus, the steering gear ratio is suitably modified depending on the road frictional coefficient so that any excessive steering on low friction road surfaces such as frozen road surfaces can be avoided.

Figure 15:
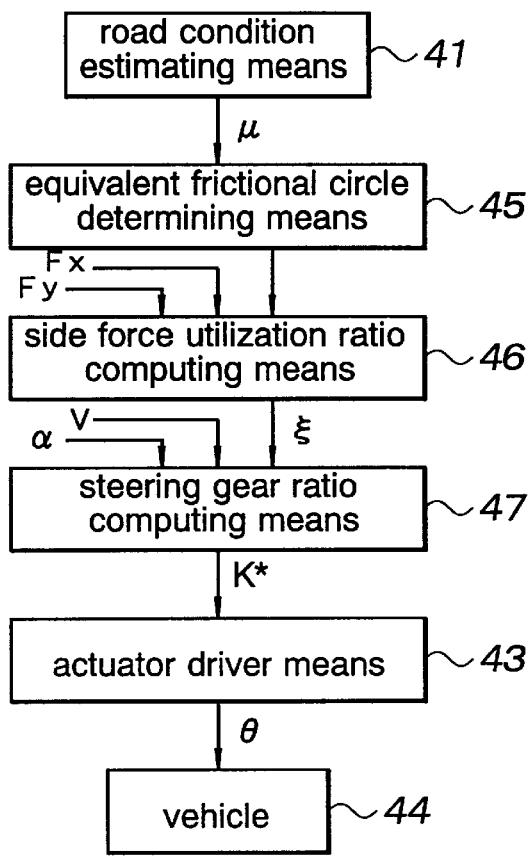
FIG. 15 is a block diagram showing a second embodiment of the control arrangement for the variable gear ratio steering system according to the present invention.

According to a second embodiment of the present invention, the control unit responds to the margin in the available side force of the front wheels. This additional feature of the mode of operation of the control unit is described in the following with reference to the block diagram of FIG. 15 in which the parts corresponding to those of the previous embodiment are denoted with like numerals.

An estimated road frictional coefficient obtained by road condition estimating means 41 is supplied to equivalent frictional circle determining means 45 which in turn determines equivalent frictional circle data and forwards it to side force utilization ratio computing means 46. The equivalent frictional circle data is selected from a number of preselected ellipses describing various equivalent frictional circles according to the estimated road frictional coefficient.

The side force utilization ratio computing means 46 receives such inputs as the fore-and-aft force Fx of the front wheels consisting of the traction force which can be computed from the vehicle speed and the intake manifold negative pressure or the braking force which can be computed from the brake line pneumatic pressure, and the side force (cornering force) Fy which can be computed from the axial rack reaction and the front wheel steering angle.

The side force utilization ratio computing means 46 computes a side force utilization ratio ξ according to such input data, and forwards it to steering gear ratio computing means 47. The side force utilization ratio ξ can be computed in the following manner. The equivalent frictional circle allows the maximum frictional force which the tire can produce to be determined, and the maximum available side force can be computed by subtracting the frictional force utilized to produce the fore-and-aft force from the maximum frictional force. The side force utilization ratio ξ is defined as the ratio of the actual side force to the maximum available side force for the given condition.

Figure 16:
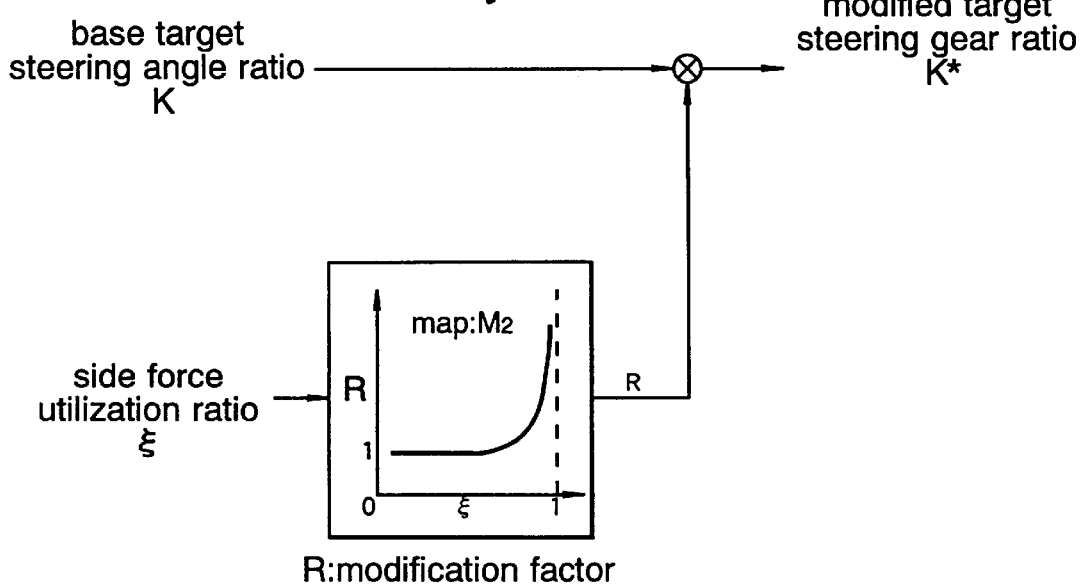
FIG. 16 is a block diagram for illustrating the control action of the steering gear ratio computing means shown in FIG. 15.

The steering gear ratio computing means 47 receives such inputs as the vehicle speed V and the steering angle α. The steering gear ratio computing means 47 computes the base target steering angle ratio K according to the vehicle speed V and the steering input α, and a modification factor R for converting the base target steering angle ratio K into the modified target steering angle ratio K* according to the side force utilization ratio ξ, and the obtained modified target steering gear ratio K* is forwarded to the actuator driver means 43 to steer the front wheels according to the vehicle speed but also taking into account the side force utilization ratio ξ. The steering gear ratio computing means 47 is incorporated with a modification factor map M2 which gives a progressively increasing value of R as the value of the side force utilization ratio ξ approaches 1 as shown in FIG. 16. By thus increasing the steering gear ratio as the side force utilization ratio ξ approaches 1 or the margin of the available side force diminishes, it becomes possible to prevent the side force utilization ratio ξ from exceeding 1. The side force utilization ratio ξ may be replaced with a lateral acceleration utilization ratio which is based on the lateral acceleration measured by using a lateral acceleration sensor.

Figure 17:
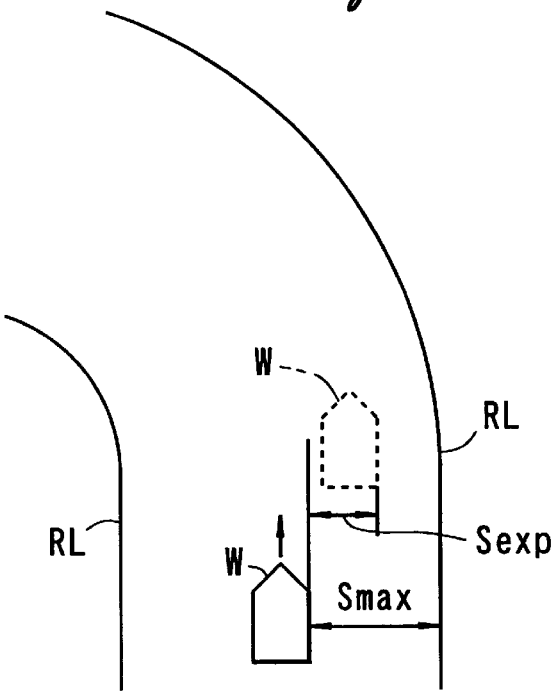
FIG. 17 is a diagram for illustrating the working principle of a third embodiment of the control arrangement for the variable gear ratio steering system according to the present invention.
Figure 18:
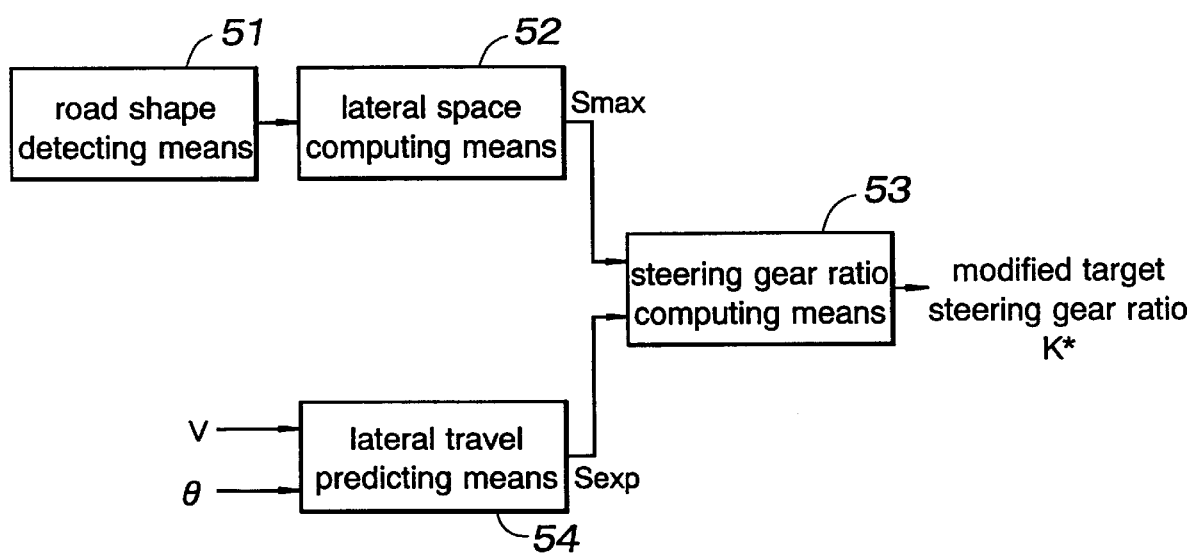
FIG. 18 is a block diagram showing the control arrangement shown in FIG. 17.

According to a third embodiment of the present invention, the control unit responds to the position of the vehicle relative to the driving lane in which the vehicle is traveling. The vehicle may be equipped with a CCD camera, for instance adjacent to a rearview mirror mounted on an upper part of the windshield, to detect the position of the vehicle with respect to the current driving lane. This additional feature of the mode of operation of the control unit is described in the following with reference to the diagram of FIG. 17 and the block diagram of FIG. 18.

Road shape detecting means 51 processes the image of the road ahead of the vehicle obtained by the CCD camera, and extracts the lane lines RL defining the driving lane as a reference for this control mode. This information is forwarded to lateral space computing means 52 which determines the maximum lateral travel which keeps the vehicle within the current driving lane. The maximum lateral travel can be defined in both the right and left directions, but for the convenience of description, only the maximum lateral travel on the right side is considered in FIG. 17. The lateral space computing means 52 computes the distance between the right side of the vehicle body W and the right driving lane line RL, and supplies this data to steering gear ratio computing means 53 as the maximum lateral travel Smax.

Figure 19:
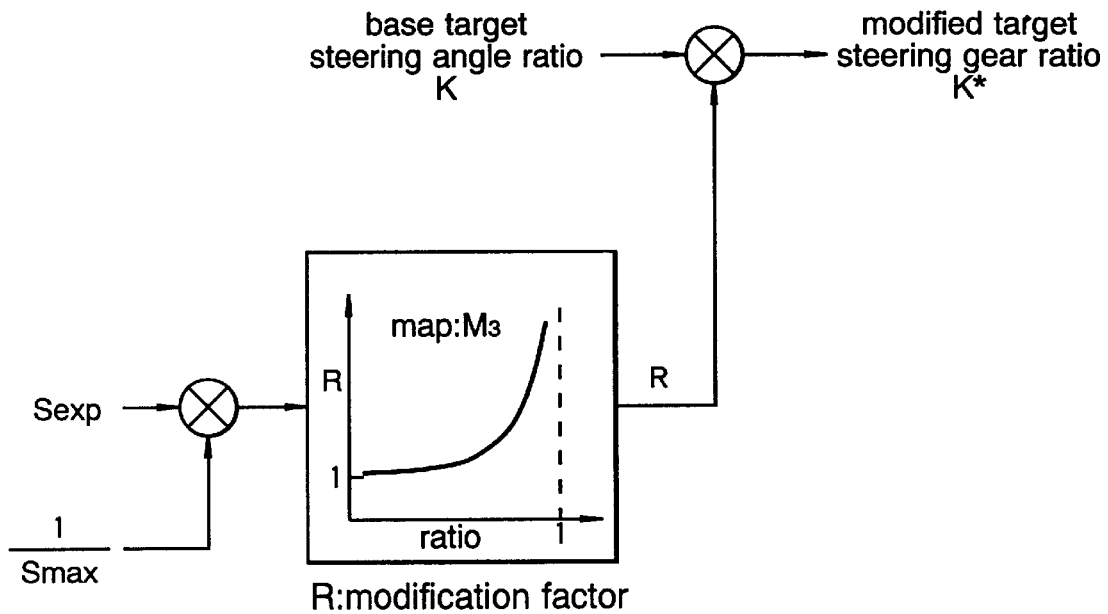
FIG. 19 is a block diagram for illustrating the control action of the steering gear ratio computing means shown in FIG. 18.

Lateral travel predicting means 54 computes an expected lateral travel Sexp in the following t seconds, and forwards this information to the steering gear ratio computing means 53. The expected lateral travel Sexp can be computed from the vehicle speed V and the steering angle θ. The time period t may consist of one second, for example, but may be selected otherwise according to the vehicle speed and the properties of the vehicle. The steering gear ratio computing means 53 computes the base target steering angle ratio K according to the vehicle speed V and the steering angle θ, and multiplies it with a modification factor R. The parameter for selecting the modification factor R may be based on the ratio of the expected lateral travel Sexp to the maximum lateral travel Smax. In this case, the map M3 should give a progressively increasing value for the modification factor R as the ratio approaches 1 as shown in FIG. 19.

Thus, by increasing the steering gear ratio with increase in the ratio of the predicted lateral travel of the vehicle to the lateral space between the lane line and the vehicle body, the vehicle is prevented from deviating from the intended drive path of the vehicle. It means that the vehicle is given with an added tendency to maintain an intended drive path, and the vehicle operator can keep the driving lane with less efforts than were required when driving a conventional vehicle.

Figure 20:
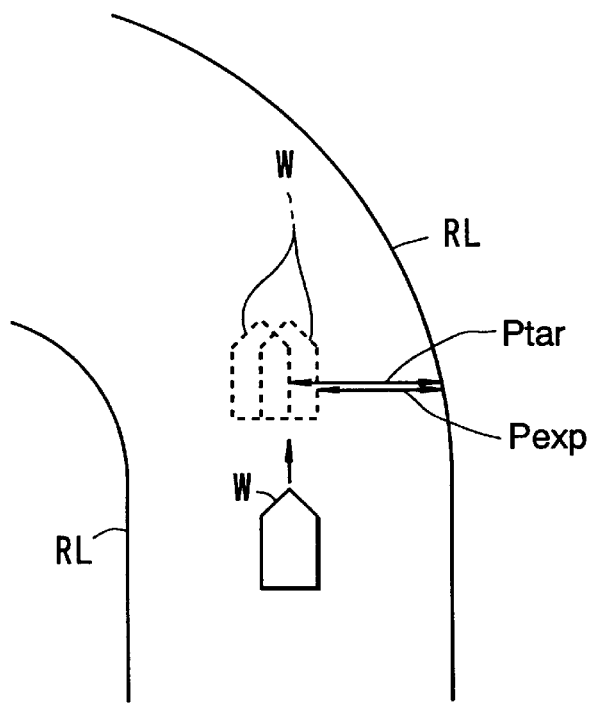
FIG. 20 is a diagram for illustrating the working principle of a fourth embodiment of the control arrangement for the variable gear ratio steering system according to the present invention.
Figure 21:
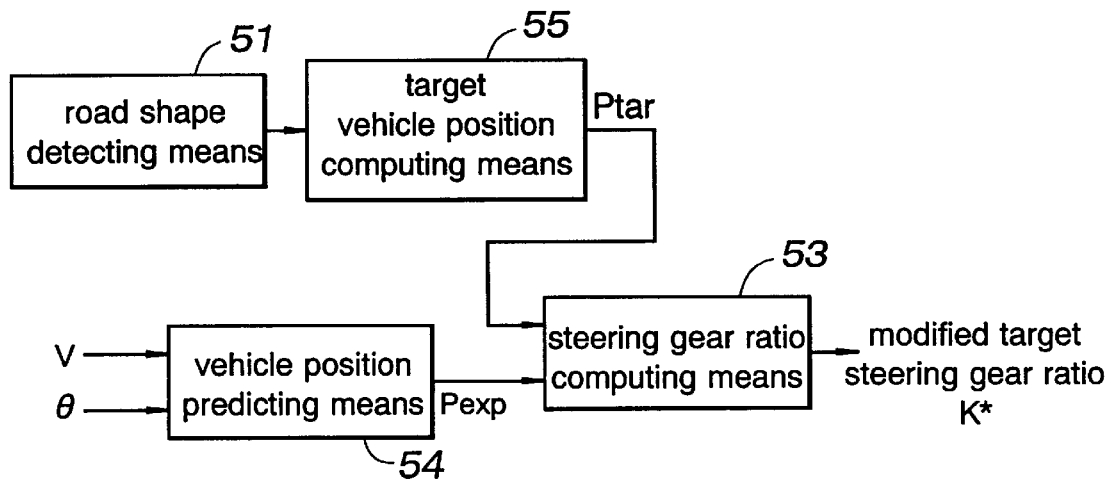
FIG. 21 is a block diagram showing the control arrangement shown in FIG. 20.
Figure 22:
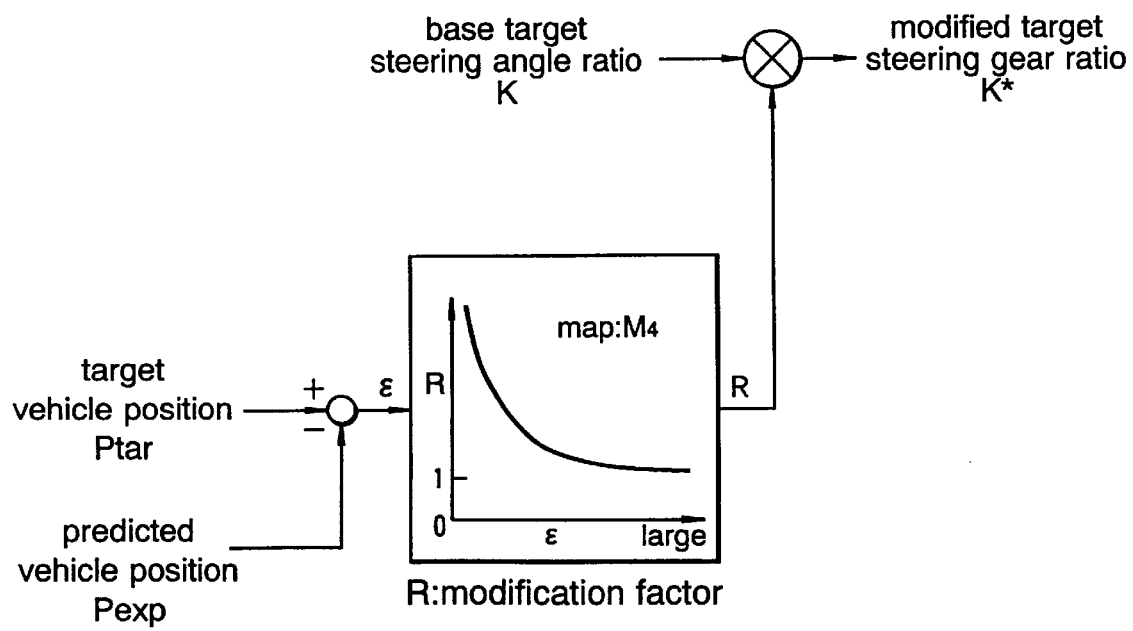
FIG. 22 is a block diagram for illustrating the control action of the steering gear ratio computing means shown in FIG. 21.

A fourth embodiment illustrated in FIGS. 20 to 21 can achieve a similar object by using a slightly different arrangement. First of all, the target position Ptar of the vehicle in the following t seconds is computed according to an output from a CCD camera monitoring the road ahead of the vehicle. It is then compared with the predicted position Pexp of the vehicle in t seconds which is computed from the vehicle speed V and the steering angle θ. The steering gear ratio computing means 53 computes the base target steering angle ratio K according to the vehicle speed V and the steering angle θ, and multiplies it with a modification factor R. The parameter for selecting the modification factor R may be based on the deviation of the predicted vehicle position Pexp from the target vehicle position Ptar. In this case, the map M4 should give a progressively increasing value for the modification factor R as the deviation diminishes as shown in FIG. 22. In this case also, as the vehicle is predicted to deviated from the intended drive path, the steering gear ratio is increased in such a manner that the vehicle is given with a tendency to stay on the same driving lane without any substantial effort on the part of the vehicle operator.

Thus, according to the present invention, the steering gear ratio is increased in situations where excessive steering is desired to be avoided, for instance when the vehicle is traveling over a low-$\mu$ road surface or the available lateral force for the front tires reaches a limit. Also, it is advantageous to increase the steering gear ratio as the vehicle deviates from the center of the current driving lane and moves toward either driving lane line so that the effort required for the vehicle operator to keep the vehicle in the current driving lane may be minimized.

A CCD camera was used to determine the shape of the road ahead of the vehicle in the above described embodiments, but it is also possible to use a global positoning system or other navigation system incorporated with map information.

Although the present invention has been described in terms of specific embodiments, it is possible to modify and alter details thereof without departing from the spirit of the present invention.

What we claim is:

1. A variable gear ratio steering system for a vehicle which can vary a ratio of a steering input angle of a steering wheel to a steering output angle of steerable wheels, comprising:

an input shaft rotatably supported by a casing for receiving a steering input;

an output shaft rotatably supported by said casing adapted to transmit a steering output to the steerable wheels of the vehicle;

a variable ratio gear unit interposed between said input shaft and said output shaft for transmitting rotative power from said input shaft to said output shaft;

steering angle ratio varying means associated with said variable ratio gear unit to vary said steering angle ratio;

control means for determining said steering angle ratio which is to be achieved by said steering angle ratio varying means according to a condition of the vehicle with respect to a given road condition; and means for detecting a road surface frictional coefficient, said control means increasing said steering angle ratio when a road surface frictional coefficient lower than a reference value is detected, wherein said steering gear ratio progressively increase with a decrease in the detected road surface frictional coefficient.

2. A variable gear ratio steering system according to claim 1, further comprising means for determining a side force utilization ratio of said steerable wheels, said control means increasing said steering angle ratio when a side force utilization ratio approaches one.

3. A variable gear ratio steering system according to claim 1, further comprising lateral space computing means for computing a maximum lateral travel which keeps said vehicle within a current drive lane, and means for predicting a lateral travel of said vehicle, said control means increasing said steering angle ratio as a ratio of said predicted lateral travel of said vehicle to said maximum lateral travel increases.

4. A variable gear ratio steering system according to claim 1, further comprising means for determining a target position of said vehicle relative to a current driving lane and means for predicting a position of said vehicle according to a current driving condition, said control means increasing said steering angle ratio as a deviation of said predicted vehicle position from a determined target vehicle position decreases.

5. A variable gear ratio steering system according to claim 1, wherein said variable ratio gear unit is adapted to reduce said steering angle ratio when said steering input angle is increased.

6. A variable gear ratio steering system according to claim 1, further comprising a vehicle speed sensor, said control means being adapted to change said steering angle ratio in dependence on a detected vehicle speed.

7. A variable gear ratio steering system for a vehicle which can vary a ratio of a steering input angle of a steering wheel to a steering output angle of steerable wheels, comprising:

an input shaft rotatably supported by a casing for receiving a steering input;

an output shaft rotatably supported by said casing adapted to transmit a steering output to the steerable wheels of the vehicle;

a variable ratio gear unit interposed between said input shaft and said output shaft for transmitting rotative power from said input shaft to said output shaft;

steering angle ratio varying means associated with said variable ratio gear unit to vary said steering angle ratio;

control means for determining said steering angle ratio which is to be achieved by said steering angle ratio varying means according to a condition of the vehicle with respect to a given road condition; and means for detecting a road surface frictional coefficient, said control means increasing said steering angle ratio when a road surface frictional coefficient lower than a reference value is detected, wherein the detected road surface frictional coefficient is measured from a reaction received by the steering device from the road surface.

8. A variable gear ratio steering system according to claim 7, further comprising means for determining a side force utilization ratio of said steerable wheels, said control means increasing said steering angle ratio when a side force utilization ratio approaches one.

9. A variable gear ratio steering system according to claim 7, further comprising lateral space computing means for computing a maximum lateral travel which keeps said vehicle within a current drive lane, and means for predicting a lateral travel of said vehicle, said control means increasing said steering angle ratio as a ratio of said predicted lateral travel of said vehicle to said maximum lateral travel increases.

10. A variable gear ratio steering system according to claim 7, further comprising means for determining a target position of said vehicle relative to a current driving lane and means for predicting a position of said vehicle according to a current driving condition, said control means increasing said steering angle ratio as a deviation of said predicted vehicle position from a determined target vehicle position decreases.

11. A variable gear ratio steering system according to claim 7, wherein said variable ratio gear unit is adapted to reduce said steering angle ratio when said steering input angle is increased.

12. A variable gear ratio steering system according to claim 7, further comprising a vehicle speed sensor, said control means being adapted to change said steering angle ratio in dependence on a detected vehicle speed.

13. A variable gear ratio steering system for a vehicle which can vary a ratio of a steering input angle of a steering wheel to a steering output angle of steerable wheels, comprising:

an input shaft rotatably supported by a casing for receiving a steering input;

an output shaft rotatably supported by said casing adapted to transmit a steering output to the steerable wheels of the vehicle;

a variable ratio gear unit interposed between said input shaft and said output shaft for transmitting rotative power from said input shaft to said output shaft;

steering angle ratio varying means associated with said variable ratio gear unit to vary said steering angle ratio;

control means for determining said steering angle ratio which is to be achieved by said steering angle ratio varying means according to a condition of the vehicle with respect to a given road condition; and means for determining a side force utilization ratio of said steerable wheels, said control means increasing said steering angle ratio when a side force utilization ratio approaches one.

14. A variable gear ratio steering system according to claim 13, further comprising means for detecting a road surface frictional coefficient, said control means increasing said steering angle ratio when a road surface frictional coefficient lower than a reference value is detected.

15. A variable gear ratio steering system according to claim 13, further comprising lateral space computing means for computing a maximum lateral travel which keeps said vehicle within a current drive lane, and means for predicting a lateral travel of said vehicle, said control means increasing said steering angle ratio as a ratio of said predicted lateral travel of said vehicle to said maximum lateral travel increases.

16. A variable gear ratio steering system according to claim 13, further comprising means for determining a target position of said vehicle relative to a current driving lane and means for predicting a position of said vehicle according to a current driving condition, said control means increasing said steering angle ratio as a deviation of said predicted vehicle position from a determined target vehicle position decreases.

17. A variable gear ratio steering system according to claim 13, wherein said variable ratio gear unit is adapted to reduce said steering angle ratio when said steering input angle is increased.

18. A variable gear ratio steering system according to claim 13, further comprising a vehicle speed sensor, said control means being adapted to change said steering angle ratio in dependence on a detected vehicle speed.

19. A variable gear ratio steering system for a vehicle which can vary a ratio of a steering input angle of a steering wheel to a steering output angle of steerable wheels, comprising:

an input shaft rotatably supported by a casing for receiving a steering input;

an output shaft rotatably supported by said casing adapted to transmit a steering output to the steerable wheels of the vehicle;

a variable ratio gear unit interposed between said input shaft and said output shaft for transmitting rotative power from said input shaft to said output shaft;

steering angle ratio varying means associated with said variable ratio gear unit to vary said steering angle ratio;

control means for determining said steering angle ratio which is to be achieved by said steering angle ratio varying means according to a condition of the vehicle with respect to a given road condition; and lateral space computing means for computing a maximum lateral travel which keeps said vehicle within a current drive lane, and means for predicting a lateral travel of said vehicle, said control means increasing said steering angle ratio as a ratio of said predicted lateral travel of said vehicle to said maximum lateral travel increases.

20. A variable gear ratio steering system according to claim 19, further comprising means for detecting a road surface frictional coefficient, said control means increasing said steering angle ratio when a road surface frictional coefficient lower than a reference value is detected.

21. A variable gear ratio steering system according to claim 19, further comprising means for determining a side force utilization ratio of said steerable wheels, said control means increasing said steering angle ratio when a side force utilization ratio approaches one.

22. A variable gear ratio steering system according to claim 19, further comprising means for determining a target position of said vehicle relative to a current driving lane and means for predicting a position of said vehicle according to a current driving condition, said control means increasing said steering angle ratio as a deviation of said predicted vehicle position from a determined target vehicle position decreases.

23. A variable gear ratio steering system according to claim 19, wherein said variable ratio gear unit is adapted to reduce said steering angle ratio when said steering input angle is increased.

24. A variable gear ratio steering system according to claim 19, further comprising a vehicle speed sensor, said control means being adapted to change said steering angle ratio in dependence on a detected vehicle speed.

25. A variable gear ratio steering system for a vehicle which can vary a ratio of a steering input angle of a steering wheel to a steering output angle of steerable wheels, comprising:

an input shaft rotatably supported by a casing for receiving a steering input;

an output shaft rotatably supported by said casing adapted to transmit a steering output to the steerable wheels of the vehicle;

a variable ratio gear unit interposed between said input shaft and said output shaft for transmitting rotative power from said input shaft to said output shaft;

steering angle ratio varying means associated with said variable ratio gear unit to vary said steering angle ratio;

control means for determining said steering angle ratio which is to be achieved by said steering angle ratio varying means according to a condition of the vehicle with respect to a given road condition; and means for determining a target position of said vehicle relative to a current driving lane and means for predicting a position of said vehicle according to a current driving condition, said control means increasing said steering angle ratio as a deviation of said predicted vehicle position from a determined target vehicle position decreases.

26. A variable gear ratio steering system according to claim 25, further comprising means for detecting a road surface frictional coefficient, said control means increasing said steering angle ratio when a road surface frictional coefficient lower than a reference value is detected.

27. A variable gear ratio steering system according to claim 25, further comprising means for determining a side force utilization ratio of said steerable wheels, said control means increasing said steering angle ratio when a side force utilization ratio approaches one.

28. A variable gear ratio steering system according to claim 25, further comprising lateral space computing means for computing a maximum lateral travel which keeps said vehicle within a current drive lane, and means for predicting a lateral travel of said vehicle, said control means increasing said steering angle ratio as a ratio of said predicted lateral travel of said vehicle to said maximum lateral travel increases.

29. A variable gear ratio steering system according to claim 25, wherein said variable ratio gear unit is adapted to reduce said steering angle ratio when said steering input angle is increased.

30. A variable gear ratio steering system according to claim 25, further comprising a vehicle speed sensor, said control means being adapted to change said steering angle ratio in dependence on a detected vehicle speed.

* * * * *